(12) United States Patent
Dec

(10) Patent No.: US 12,000,482 B2
(45) Date of Patent: Jun. 4, 2024

(54) RING TENSIONER

(71) Applicant: GATES CORPORATION, Denver, CO (US)

(72) Inventor: Andrzej Dec, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 18/065,539

(22) Filed: Dec. 13, 2022

(65) Prior Publication Data

US 2023/0193983 A1 Jun. 22, 2023

Related U.S. Application Data

(60) Provisional application No. 63/290,854, filed on Dec. 17, 2021.

(51) Int. Cl.
*F16H 7/08* (2006.01)
*F16H 7/02* (2006.01)
*F16H 55/36* (2006.01)

(52) U.S. Cl.
CPC .............. *F16H 7/08* (2013.01); *F16H 7/023* (2013.01); *F16H 55/36* (2013.01); *F16H 7/0838* (2013.01); *F16H 2007/0842* (2013.01); *F16H 2055/363* (2013.01); *F16H 2055/366* (2013.01)

(58) Field of Classification Search
CPC ... F16H 7/02; F16H 7/023; F16H 7/04; F16H 7/006; F16H 7/08; F16H 7/0838; F16H 2007/0802; F16H 2007/0842; F16H 2007/0863; F16H 2007/0865; F16H 2007/087; F16H 2007/185; F16H 7/12; F16H 7/1209; F16H 7/1245; F16H 7/1254; F16H 7/18; F16H 55/36; F16H 55/38; F16H 55/49; F16H 55/52; F16H 55/54; F16H 2055/363
See application file for complete search history.

(56) References Cited

U.S. PATENT DOCUMENTS

| 758,561 | A | * | 4/1904 | Reed | F16H 55/54 |
| | | | | | 474/52 |
| 1,567,494 | A | * | 12/1925 | Fahrney | F16H 7/08 |
| | | | | | 474/132 |
| 3,472,563 | A | * | 10/1969 | Irgens | B62D 55/125 |
| | | | | | 305/195 |

(Continued)

FOREIGN PATENT DOCUMENTS

| DE | 10340966 A1 | 9/2004 | |
| DE | 102007009961 A1 | * 4/2008 | ............... F16H 7/20 |

(Continued)

OTHER PUBLICATIONS

Search Report completed by the European Patent Office dated Apr. 21, 2023 for International Patent Application PCT/US2022/081470.

*Primary Examiner* — Michael R Mansen
*Assistant Examiner* — Raveen J Dias
(74) *Attorney, Agent, or Firm* — Kevin J. Aiken, Esq.

(57) ABSTRACT

Ring tensioners having a plurality of rungs that extend from a first side to an opposite second side of the ring tensioner, in use, the rungs engaging between the teeth of a toothed belt. Both the first side and the second side of the ring tensioner are not continuous but have gaps. The gaps on the first side alternate with the gaps on the second side. The ring tensioners may be formed from a single length of wire.

17 Claims, 13 Drawing Sheets

(56) References Cited

U.S. PATENT DOCUMENTS

| | | | | | |
|---|---|---|---|---|---|
| 3,574,287 | A | * | 4/1971 | Heidacker | F16H 7/08 |
| | | | | | 474/132 |
| 3,888,132 | A | * | 6/1975 | Russ, Sr. | F16G 1/28 |
| | | | | | 474/205 |
| 3,926,063 | A | * | 12/1975 | Mayfield | F16H 7/1254 |
| | | | | | 474/132 |
| 5,190,363 | A | * | 3/1993 | Brittain | B62D 55/088 |
| | | | | | 305/137 |
| 5,417,617 | A | * | 5/1995 | Milton | F16H 55/171 |
| | | | | | 474/93 |
| 5,460,059 | A | * | 10/1995 | Kato | F16H 19/06 |
| | | | | | 74/89.21 |
| 5,551,926 | A | * | 9/1996 | Ebert | F16H 7/0829 |
| | | | | | 474/136 |
| 6,000,766 | A | * | 12/1999 | Takeuchi | B62D 51/04 |
| | | | | | 305/165 |
| 6,126,562 | A | * | 10/2000 | Brangenfeldt | F16H 7/16 |
| | | | | | 474/101 |
| 6,488,602 | B1 | * | 12/2002 | Ebert | F16H 7/0829 |
| | | | | | 474/101 |
| 7,198,337 | B2 | * | 4/2007 | Deckler | B60B 3/041 |
| | | | | | 305/195 |
| 9,415,943 | B2 | * | 8/2016 | Carrara | B65G 39/02 |
| 2002/0176722 | A1 | * | 11/2002 | Iijima | G03G 15/757 |
| | | | | | 399/167 |
| 2003/0104889 | A1 | * | 6/2003 | Redmond | F16H 7/023 |
| | | | | | 474/205 |
| 2009/0137353 | A1 | * | 5/2009 | Serkh | F16H 55/54 |
| | | | | | 474/49 |
| 2010/0105509 | A1 | * | 4/2010 | Tomobuchi | F16H 55/171 |
| | | | | | 474/153 |
| 2011/0300978 | A1 | * | 12/2011 | Sakamoto | F16H 55/171 |
| | | | | | 474/152 |
| 2016/0007538 | A1 | * | 1/2016 | Fuchs | A01D 61/008 |
| | | | | | 460/114 |
| 2016/0245374 | A1 | * | 8/2016 | Ebert | F16H 7/0838 |
| 2017/0284530 | A1 | * | 10/2017 | Lee | F16H 55/566 |
| 2018/0135731 | A1 | * | 5/2018 | Takagi | F16H 7/08 |
| 2018/0274189 | A1 | * | 9/2018 | Champagne | F16H 7/14 |
| 2021/0024172 | A1 | * | 1/2021 | Mohrmann | F16G 1/08 |
| 2022/0034386 | A1 | * | 2/2022 | Zock | F16H 7/06 |
| 2022/0107014 | A1 | * | 4/2022 | Kaplan | F16H 55/171 |
| 2022/0145969 | A1 | * | 5/2022 | Whiteman | F16H 37/065 |
| 2022/0282778 | A1 | * | 9/2022 | Oord | A01D 61/008 |

FOREIGN PATENT DOCUMENTS

| | | | | |
|---|---|---|---|---|
| DE | 102007031985 B3 | | 8/2008 | |
| EP | 1452775 A1 | * | 9/2004 | F16H 7/0838 |
| EP | 2014951 A2 | * | 1/2009 | F16H 7/0838 |
| FR | 3075909 A1 | * | 6/2019 | F16H 55/30 |
| WO | WO-0188410 A1 | * | 11/2001 | F16H 7/08 |

* cited by examiner

RING TENSIONER

CROSS-REFERENCE

This application claims priority to U.S. provisional application No. 63/290,854 filed Dec. 17, 2021 and titled RING TENSIONER, the entire disclosure of which is incorporated herein by reference for all purposes.

BACKGROUND

Belt tensioners are well known devices that are used in many belt-drive systems. Tensioners generally apply a constant belt-tensioning force, which compensates for increases in belt length due to wear, belt expansion (e.g., due to increased temperature) and other factors.

Some synchronous belt drives have a predetermined distance between pulley centers, which distance cannot be altered. This creates a problem of matching belt length with belt drive length. Belt length is selected to assure that the belt fits snugly with tension in the belt after installation. Additionally, during use, the belt wears and stretches, which requires adjustment of the belt tension, if possible, or belt replacement if there is no ability to adjust the belt tension.

Due to the nature of synchronous belts, the belt length of the belt changes in increments. The smallest belt length change equals one pitch length of that belt pitch.

Also, the belt pulley, idler or sprocket diameter cannot be a random diameter nor can any diameter change be made. Once properly sized for the belt, the smallest increment of diameter change is dictated by the width of one groove.

In systems where the distance between sprockets, idlers or pulleys cannot change, there is a need for a device that generates tension in the belt. Certain systems or applications, e.g., conveyor belts, do not have features to which conventional belt tensioners could be attached. For some systems or applications, it is possible to attach a conventional tensioner, but may of these have space constraint, making installing or using the tensioner difficult or even impossible.

Thus, there is a need for a belt tensioner that can be easily and readily used in systems with fixed distances.

SUMMARY

The present disclosure provides ring tensioners for a belt system, such as for a fixed two-point system, which as a toothed belt running between two gears, pulleys, idlers, or sprockets that are both fixed in place.

The ring tensioners of this disclosure have a plurality of rungs that extend from a first side to an opposite second side of the ring tensioner, in use, the rungs engaging with the belt between the belt teeth. The plurality of rungs are connected by radiused portions, which form a flange or flange-like structure, which improve the engagement between the tensioner and the belt on which it is installed. Both the first side and the second side of the ring tensioner are not continuous but have gaps. The gaps on the first side alternate with the gaps on the second side.

In one particular implementation, this disclosure provides a belt ring tensioner having a plurality of equally spaced parallel rungs each rung having a first end and a second end, the first ends of the rungs at a first side of the ring tensioner and the second ends of the rungs at a second side of the ring tensioner, a first circumferential edge at the first side of the ring tensioner that is not continuous, and a second circumferential edge at the second side of the ring tensioner that is not continuous.

In another particular implementation, this disclosure provides a belt ring tensioner that includes a plurality of parallel rungs and radiused portions, each radiused portion connecting two adjacent rungs. A first circumferential edge of the ring tensioner is not continuous, nor is a second circumferential edge of the ring tensioner continuous.

In yet another particular implementation, this disclosure provides a belt ring tensioner that includes a plurality of pairs of parallel rungs where each pair has a first rung and a second rung that are connected to each other at only one end of each of the first rung and the second rung by a radiused portion, where adjacent pairs share one rung. The radiused portions may form a flange or flange-like structure, to facilitate tracking when the ring tensioner is installed on and in use with a belt.

These and other aspects of the tensioner described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

DETAILED DESCRIPTION

Figure 1:
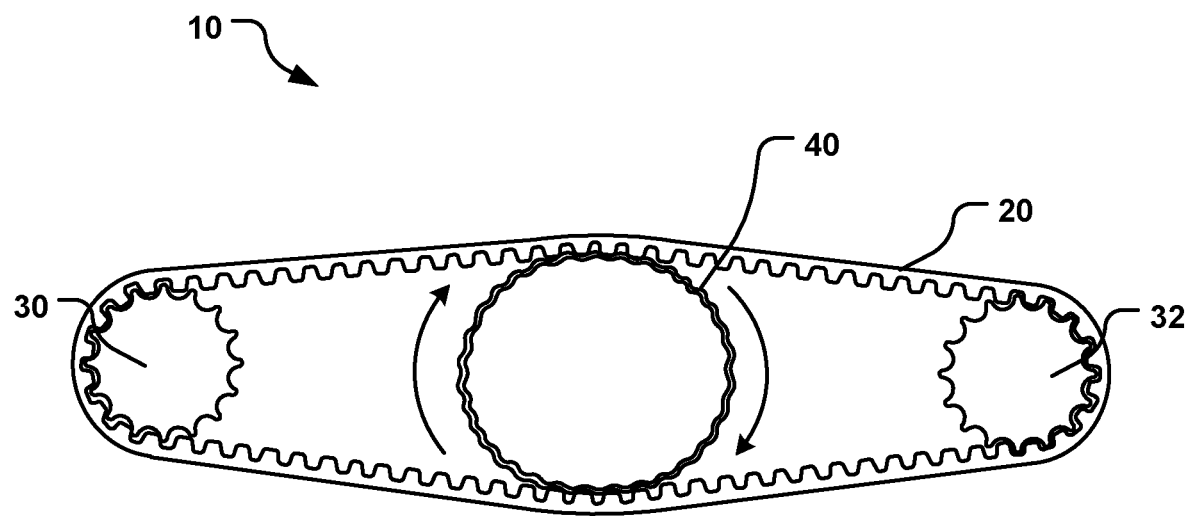
FIG. 1 is side view of a fixed belt system with a floating tensioner.

As indicated above, the present disclosure is directed to belt tensioners for systems having a fixed distance between belt engagement points (e.g., gears, sprockets, pulleys, idlers, etc.), such as found in, e.g., fixed, two-point belt systems. Such fixed systems may be found, for example, in synchronous belt transmissions, as automotive timing belts, and numerous industrial applications including printing machines, conveyor systems, cleaning systems, and in industries such as breweries, aluminum processing plants, power plants, sandblasting machines, agriculture, and mining.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Turning to the figures, FIG. 1 shows a common configuration of a belt system 10 that includes a flexible belt 20 extending between two rotation points 30, 32, which can be gears, sprockets, pulleys, idlers, etc., one of which may be driven. In the figure, the belt 20 rotates clockwise, shown by the direction of the arrows.

Engaged with the belt 20 is a ring tensioner 40. When one of the rotation points 30, 32 is driven or otherwise rotates so that the belt 20 rotates clockwise, the generally annular ring tensioner 40 also rotates clockwise, as it is engaged with both the top side or span and the bottom side or span of the belt 20. During rotation of the belt 20, the ring tensioner 40 constantly acts on both spans with the same diametrically directed tensioning force and the same damping.

The ring tensioner 40 is not attached, mounted, or otherwise fixed to any solid or stationary structure, but rather, the ring tensioner 40 is held in place, between the two spans of the belt 20, by the belt 20. It could be said that the ring tensioner 40 is floating.

The ring tensioner 40 increases the tension within the belt 20 by adjusting the tracking position of the belt 20. The presence of the ring tensioner 40 increases the distance between the top span and the bottom span of the belt 20, thus increasing the path of the belt 20.

Figure 2:
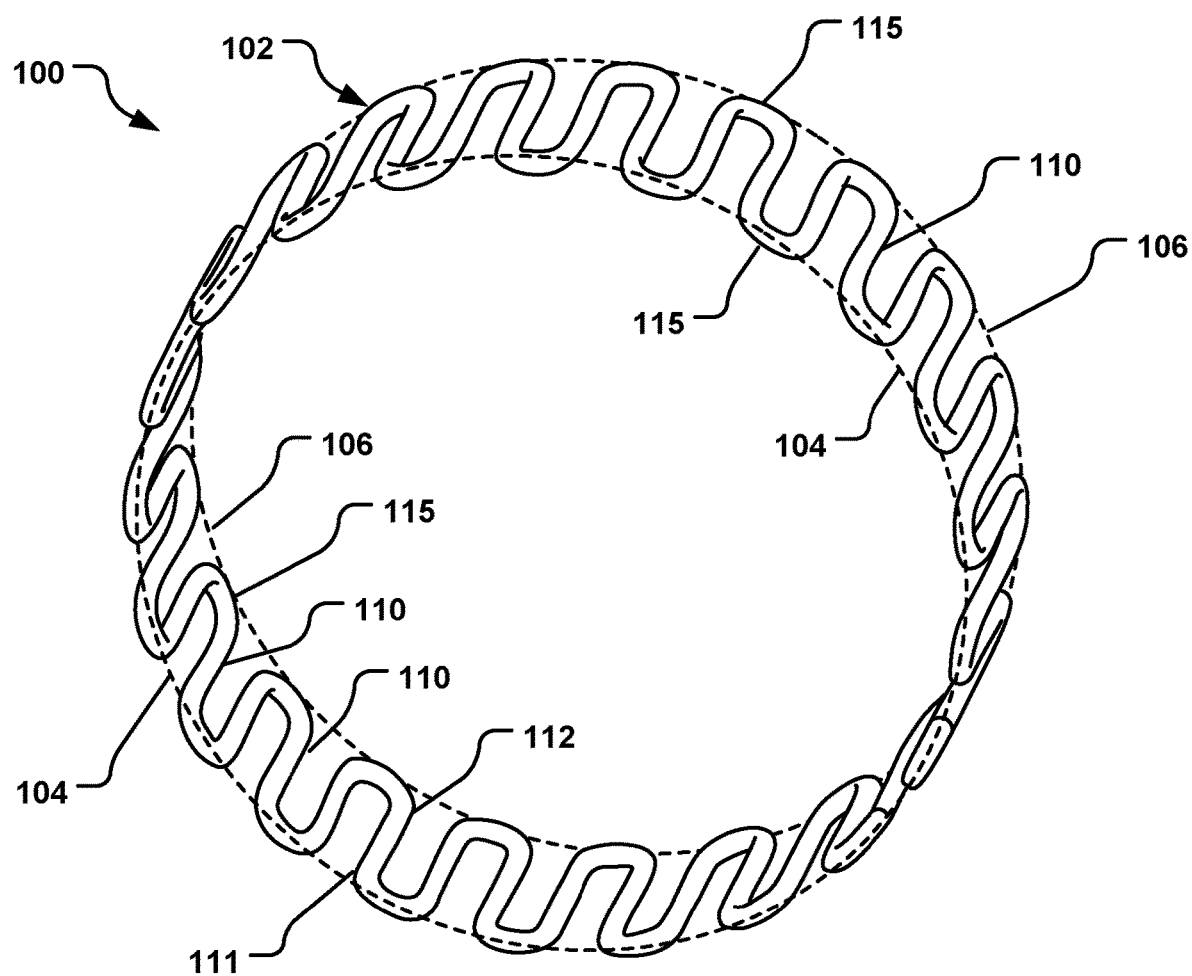
FIG. 2 is a perspective view of a first example of a ring tensioner.

FIG. 2 shows a ring tensioner 100 for use in a belt system such as the system 10 of FIG. 1. The ring tensioner 100 has a ring body 102 having a first side 104 and a second side 106. The body 102 is formed by a plurality of parallel rungs 110, each rung 110 having a first end 111 and a second end 112. The first ends 111 of the rungs 110 are present at the first side 104 of the body 102 and the second ends 112 of the rungs 110 are present at the second side 106 of the body 102, so that the rungs 110 extend from the first side 104 to the second side 106. The rungs 110 define the outer circumferential edge of the ring tensioner 100.

Around the body 102, two adjacent rungs 110 are connected to each other by a curved or radiused portion 115. The rungs 110 and the radiused portions 115 are at or generally at the same radial distance from the center point of the ring tensioner 100; in other words, two adjacent rungs 110 and their radiused portion 115 are generally planar, subject to the overall curvature of the body 102 of the ring tensioner 100.

Figure 3:
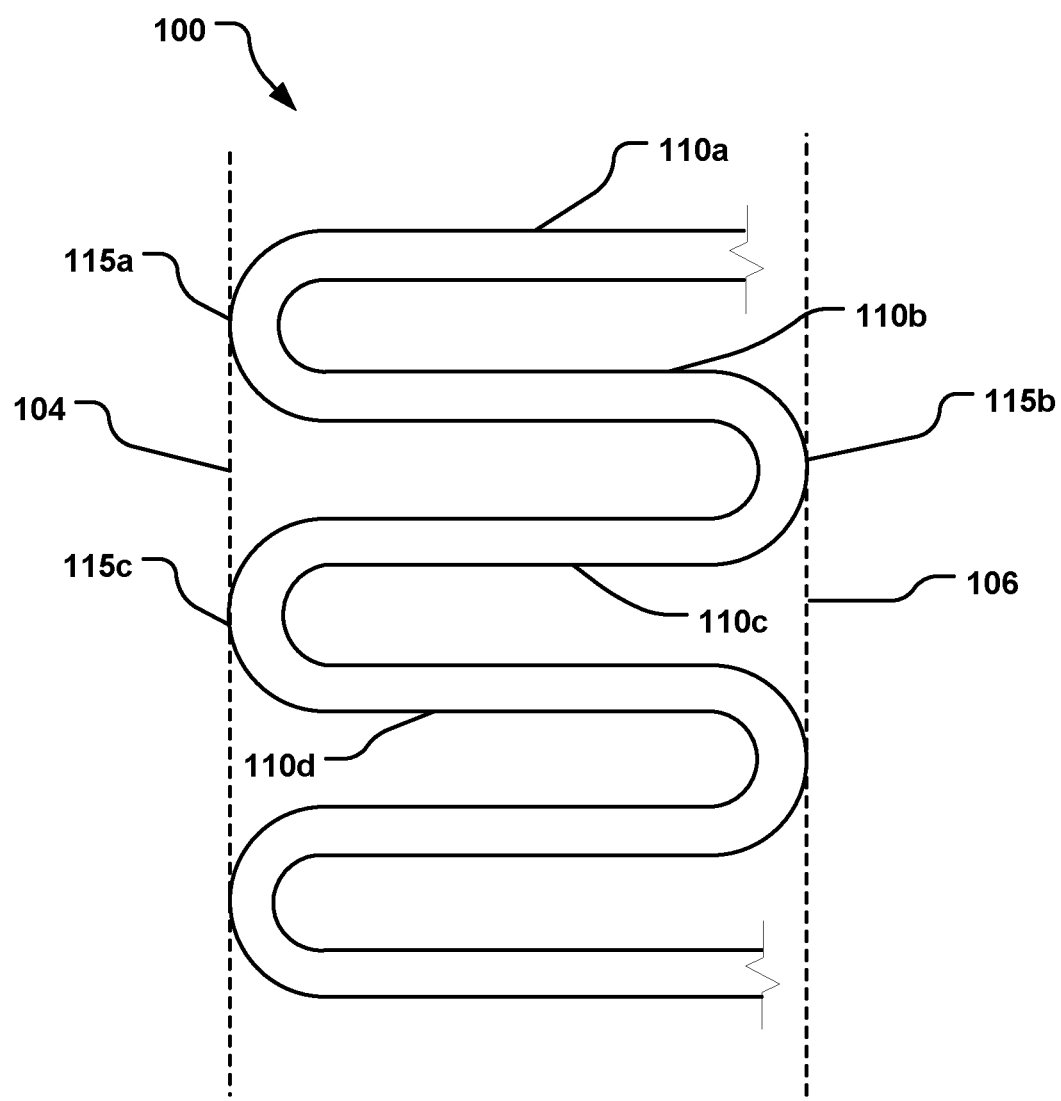
FIG. 3 is a plan view of a portion of the ring tensioner of FIG. 2.

As seen in FIG. 3, a pair of rungs 110, specifically rung 110a and a rung 110b, are connected by a radiused portion 115a at the first side 104, and another pair of rungs 110, specifically the rung 110b and a rung 110c, are connected by a radiused portion 115b at the second side 106, and another pair of rungs 110, specifically the rung 110c and a rung 110d, are connected by a radiused portion 115c at the first side 104, etc. Thus, in such a manner, the radiused portions 115 alternate from the first side 104 to the second side 106. Because of this alternating placement of the radiused portions 115, neither side 104, 106 is continuous, but has gaps, voids, or spans between the radiused portions 115.

In order to have the radiused portions 115 alternate from the first side 104 to the second side 106 around the circumferential edges of the ring tensioner 100, there is an even number of rungs 110. As an example, a ring tensioner 100 having forty rungs 110 will have twenty radiused portions 115 on the first side 104 and twenty radiused portions 115 on the second side 106.

The ring tensioner 100 has a diameter and a width (from the first side 104 to the second side 106) configured for the belt and the belt system in which it is to be installed. The width of the ring tensioner is no less than the width of the belt, but may be greater than the width of the belt. The distance between rungs 110 is equal to or essentially equal to (e.g., a little less, e.g., a little more) than the pitch length (the distance between teeth) of the belt. The rungs 110 are evenly spaced around the circumference of the ring tensioner 100. This distance between rungs 110 may be adjusted based on the ring diameter, the diameter of the rungs 110 (e.g., the diameter of the wire forming the rungs) and on the wrap angle of the belt around the ring tensioner 100.

The radiused portions 115 provide a flange-like structure that may facilitate tracking of the ring tensioner 100 on a belt when in operation. The radiused portions 115 may abut the side edges of the belt, depending on the width of the tensioner 100 from side 104 to side 106 and the width of the belt, and help improve the engagement of the ring tensioner 100 with the belt.

The ring tensioner 100 should be sufficiently rigid to inhibit compression in the radial direction, and if compressed, sufficiently elastic to return to an uncompressed shape.

Examples of suitable materials for the ring tensioner 100 include metal (e.g., steel, stainless steel, nickel, iron, aluminum, alloys) and polymer(s) (e.g., polycarbonate, polystyrene, polyethylene).

If metal, the ring tensioner 100 can be formed from a single piece or length of wire, with the ends of the wire joined (e.g., welded, brazed, soldered, clipped, clamped, glued, or otherwise connected). The cross-section of the wire may be circular, oval or elliptical, square or rectangular optionally with radiused corners, or trapezoidal optionally with radiused corners Alternately, the ring tensioner 100 could be molded, cast, or otherwise formed with metal or polymer.

One skilled in materials will be able to design a ring tensioner with appropriate fillers, reinforcing materials, additives, coatings, etc., as warranted to provide the desired ring tensioner.

In one particular example, the ring tensioner 100 has an overall diameter (when measured to the center of the wire or other material forming the tensioner) of 104.07 mm (with a wire diameter of 2.78 mm), 42 rungs, and a distance between adjacent rungs 110 (when measured to the center of the wire or other material forming the tensioner) of 7.76 mm.

To install the ring tensioner 100 in a belt system, such as the system 10 of FIG. 1, the ring tensioner 100 is merely inserted between and seated between the top span and the bottom span of the belt 20. Depending on the slack in the belt 20, the ring tensioner 100 may be compressed, e.g., by hand or by a tool, to distort (e.g., form an oval) to allow insertion between the belt spans. The ring tensioner 100 may be inserted equidistant between the two rotation points 30, 32 or may be positioned closer to one point (e.g., sprocket) than the other.

The ring tensioner 100 is seated so that the rungs 110 sit in the grooves or land regions of the belt between the teeth of the belt 20. The radiused portions 115 wrap around the ends of the belt teeth, thus facilitating retention of the ring tensioner 100 on the belt.

The ring tensioner 100 exerts force on either belt side or span, and thus generates tension in the belt.

The ring tensioner 100 may be installed in a belt that runs vertical, horizontal, or diagonal, or one that has multiple directions (e.g., an "l" shaped belt path). As indicated above, the ring tensioner may be centered equidistant between two rotation points or may be positioned closer to one point than the other. More than one ring tensioner may be used in a belt, e.g., between two rotation points or in each leg of an "l" shaped belt path.

During operation, the ring tensioner 100 rotates in conjunction with the belt. That is, one ring side (e.g., the top side) rotates with the belt (e.g., the top span) in the same direction as the belt while the opposite ring side (e.g., the bottom side) rotates with the belt (e.g., the bottom span) in the same direction as the belt, which is the opposite direction of the first side. Consequently, the ring tensioner center remains stationary regardless of belt speed.

Figure 4:
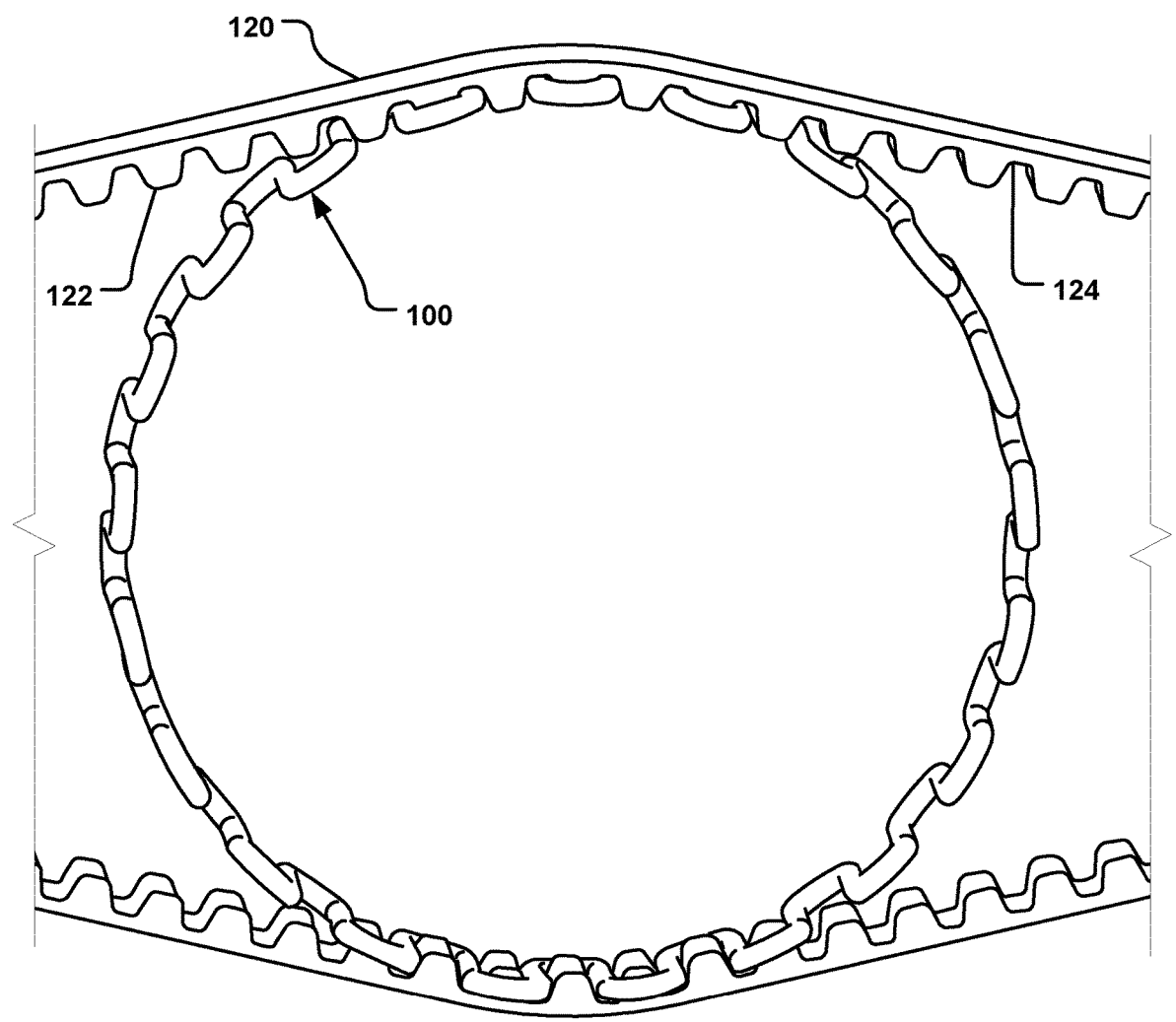
FIG. 4 is a side view of a portion of a belt system showing a portion of a flexible belt and the ring tensioner of FIG. 2.

FIG. 4 shows the ring tensioner 100 installed on a polymeric or rubber belt 120 that has some elasticity. The belt 120 is a toothed belt, having individual transverse teeth 122 evenly spaced the length of the belt 120. Between adjacent teeth 122 are land regions 124.

The ring tensioner 100 seats between the teeth 122, in or on the land regions 124, of the belt 120. As seen in the figure, one or both of the teeth 122 and the land regions 124 expand when engaged with the ring tensioner 100 to allow the rungs 110 to seat within the land regions 124.

It is noted that "pitch" or "pitch distance" of a belt is measured at the belt cord, rather than at the rubber, because the belt cord does not change its length, whereas rubber in the belt above and below the cord compresses and stretches, thus changing length. The pitch or pitch distance is measured on a flat/straight section of belt. The belt cord is positioned above the land between the grooves. Consequently, when bent, the cord lies at a larger distance from center than the rungs of the tensioner. This causes the length of pitch at the cord to be longer than the distance between the rungs.

In one particular example, with such an elastic belt having a belt pitch of 8.0 mm, the ring tensioner 100 has an overall diameter (when measured to the center of the wire or other material forming the tensioner) of 104.07 mm (with a wire diameter of 2.78 mm), 42 rungs 110, and a distance between adjacent rungs 110 (when measured to the center of the wire or other material forming the tensioner) that is 7.76 mm.

Figure 5:
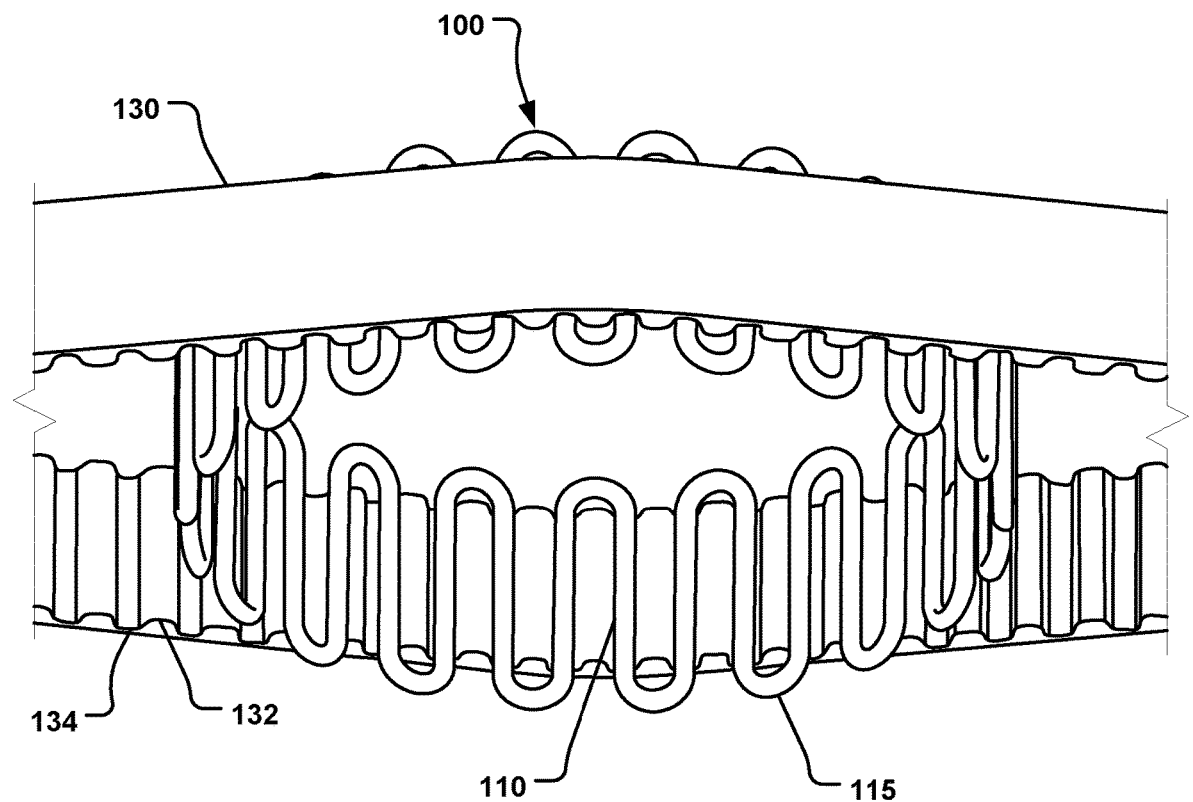
FIG. 5 is a top perspective view of a portion of a belt system showing a portion of another flexible belt and the ring tensioner of FIG. 2.

FIG. 5 shows the ring tensioner 100 installed on a belt 130. This belt 130 also is a toothed belt, having individual transverse teeth 132 evenly spaced the length of the belt 130 with land regions 134 between adjacent teeth 132, but is not elastic and does not change dimensions.

In this system, however, with the belt 130, the belt 130 is not stretched or distorted by the ring tensioner 100, but the dimensions of the teeth 132 and the land regions 134 remain unchanged upon engagement with the ring tensioner 100. Thus, for this belt 130, adjacent rungs 110 of the ring tensioner 100 are spaced a distance essentially equal to the width of a tooth 132 in the belt 130.

Figure 6A:
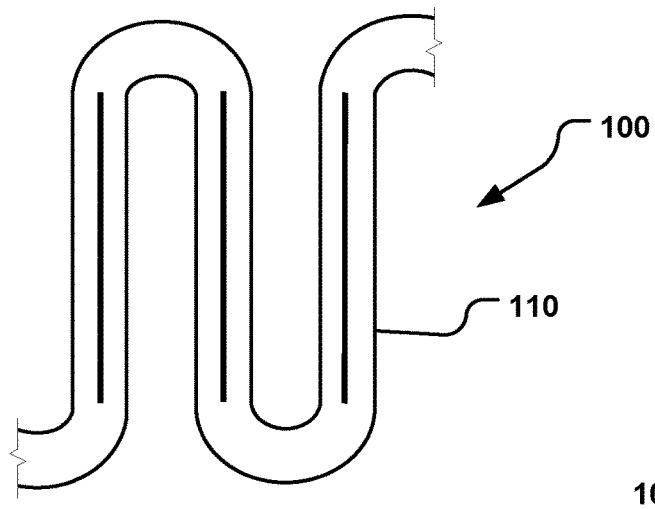
FIGS. 6A, 6B and 6C are a top view, perspective view, and side view, respectively, of an annotated portion of the ring tensioner of FIG. 2 in a relaxed state.
Figure 6B:
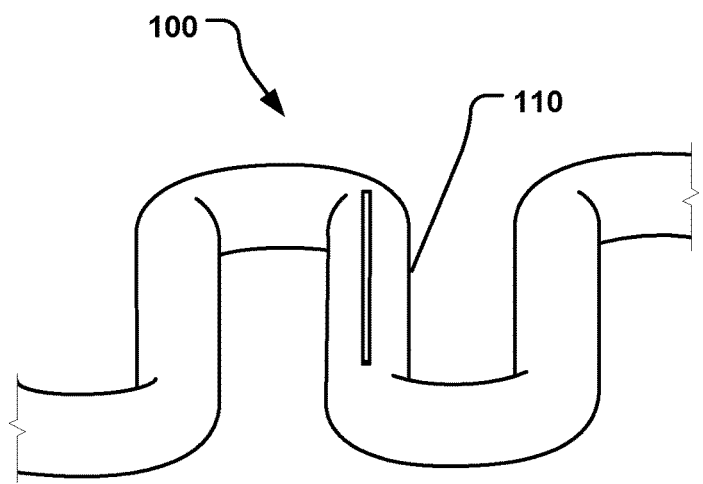
Figure 6C:
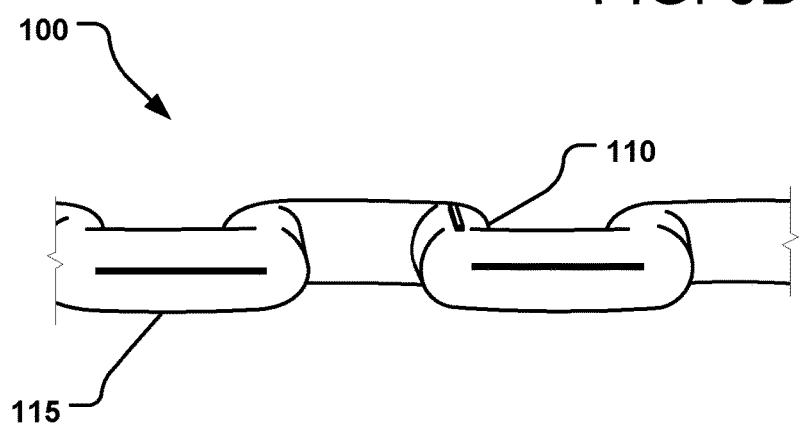

The ring tensioner 100, and variants thereof, is a combination of a torsion spring and a compression spring. Referring to FIGS. 6A through 6C, when the rungs 110 and radiused portions 115 are flat or generally planar, as they would be if the overall tensioner was not a ring but was flat, no part of the device is subjected to any deflection. See FIGS. 6A through 6C where this is represented by straight lines on the surfaces of the device.

Figure 7A:
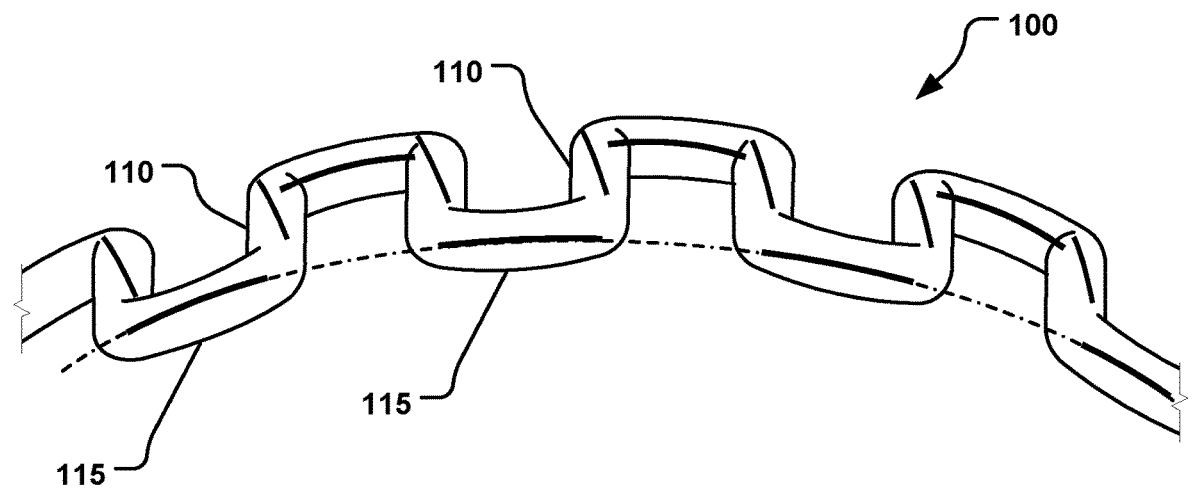
FIG. 7A is a perspective view of an annotated portion of the ring tensioner of FIG. 2 in a bent or deflected state.
Figure 7B:
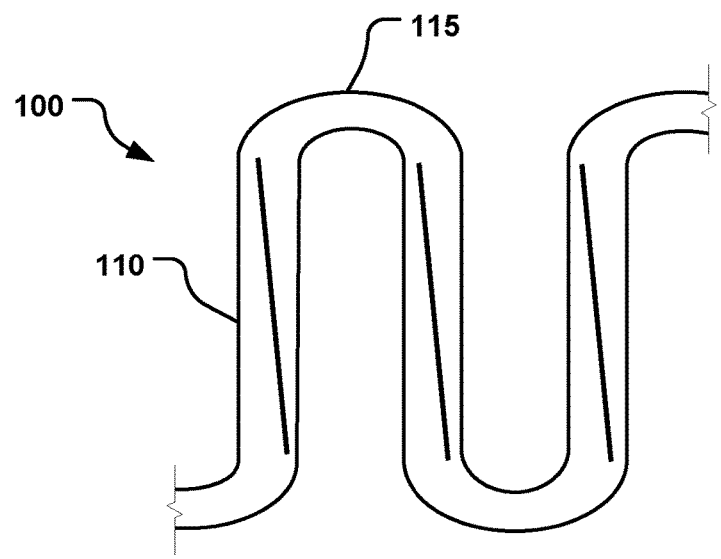
FIG. 7B is a top view of an annotated portion of the bent or deflected ring tensioner of FIG. 7A.

When the device is bent or deflected, as in FIG. 7A, the radiused portions 115 bend based on the radius of the ring tensioner 100, acting like compression springs or beams, bending around the center of the tensioner 100. This bending of the radiused portions 115 causes the rungs 110 to work as torsions bars, twisting around their respective center axis, as shown in FIG. 7B.

Figure 8:
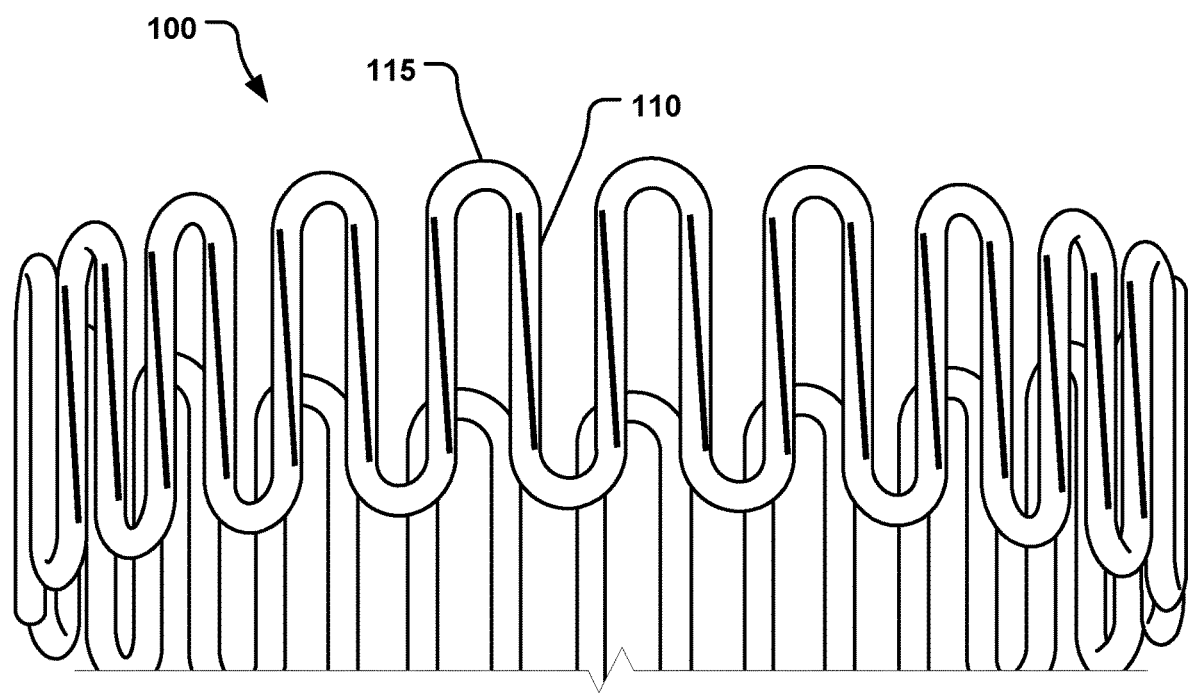
FIG. 8 is a perspective view of the annotated ring tensioner in a bent or deflected state.

In FIG. 8, it is seen that the rungs 110 work as torsion springs and the radiused portions 115 work as beams or compression springs. Because of this, the ring tensioner 100 is a combination of multiple torsion and compression springs, yielding a very high spring rate (e.g., the spring is very elastic).

Figure 9:
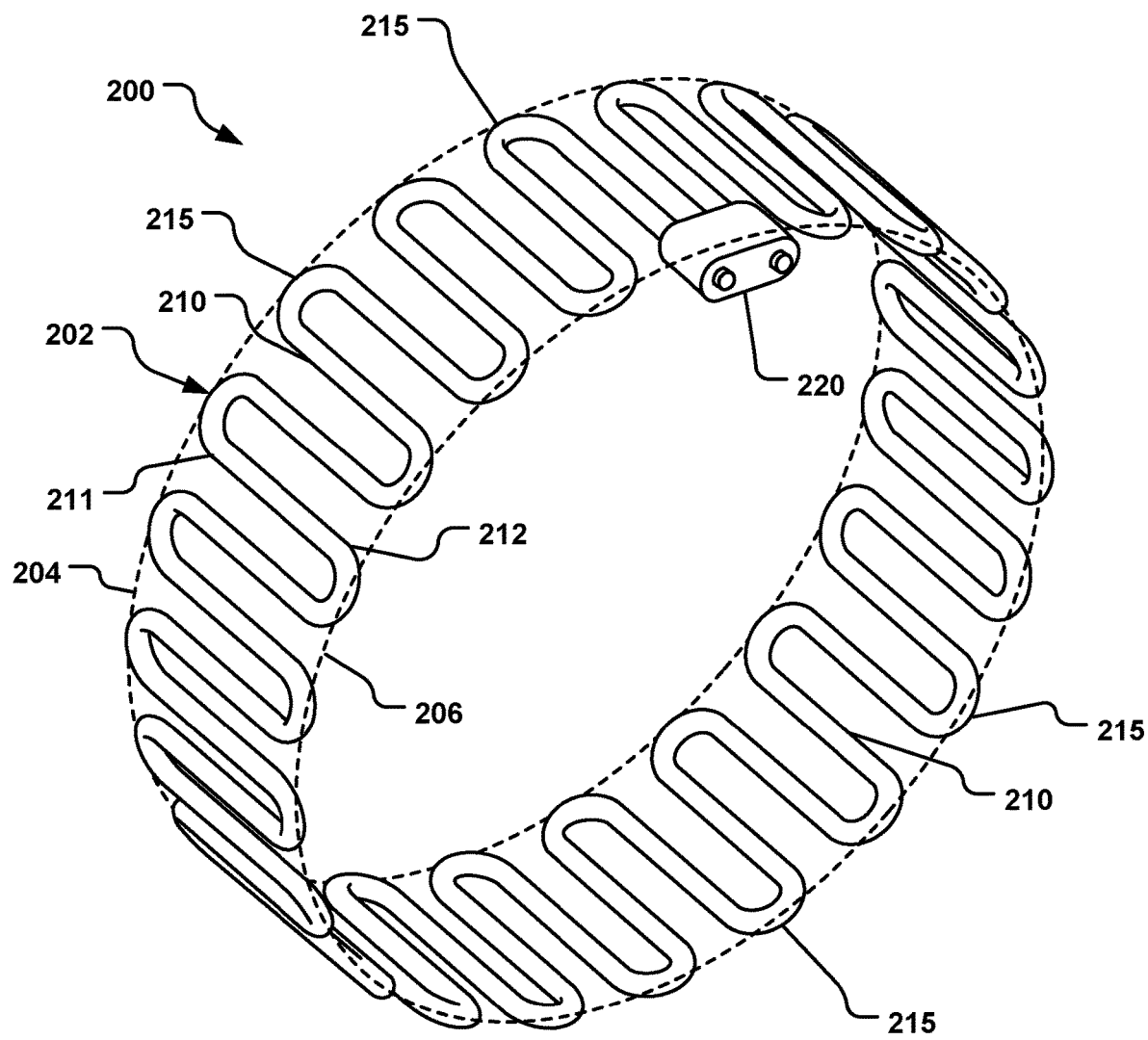
FIG. 9 is a perspective view of a second example of a ring tensioner.

FIG. 9 shows another ring tensioner 200. It is to be understood that various features and/or details from the tensioner 100, described above, may be applied to this ring tensioner 200 unless contrary to the construction.

Similar to the ring tensioner 100, the ring tensioner 200 has a ring body 202 having a first side 204 and a second side 206. The body 202 is formed by a plurality of parallel rungs 210, each rung 210 having a first end 211 and a second end 212. The first ends 211 of the rungs 210 are present at the first side 204 of the body 202 and the second ends 212 of the rungs 210 are present at the second side 206 of the body 202. Two adjacent rungs 210 are connected to each other by a curved or radiused portion 215 in the same plane as the connected rungs 210, so that the radiused portions 215 alternate from the first side 204 to the second side 206. Because of this alternating placement of the radiused portions 215, neither side 204, 206 is continuous, but has gaps, voids, or spans between the radiused portions 215.

The ring tensioner 200 is formed from a single, elongate wire, the ends of which are connected at a joint 220, such as a clamp, which replaces one of the radiused portions 215.

Figure 10:
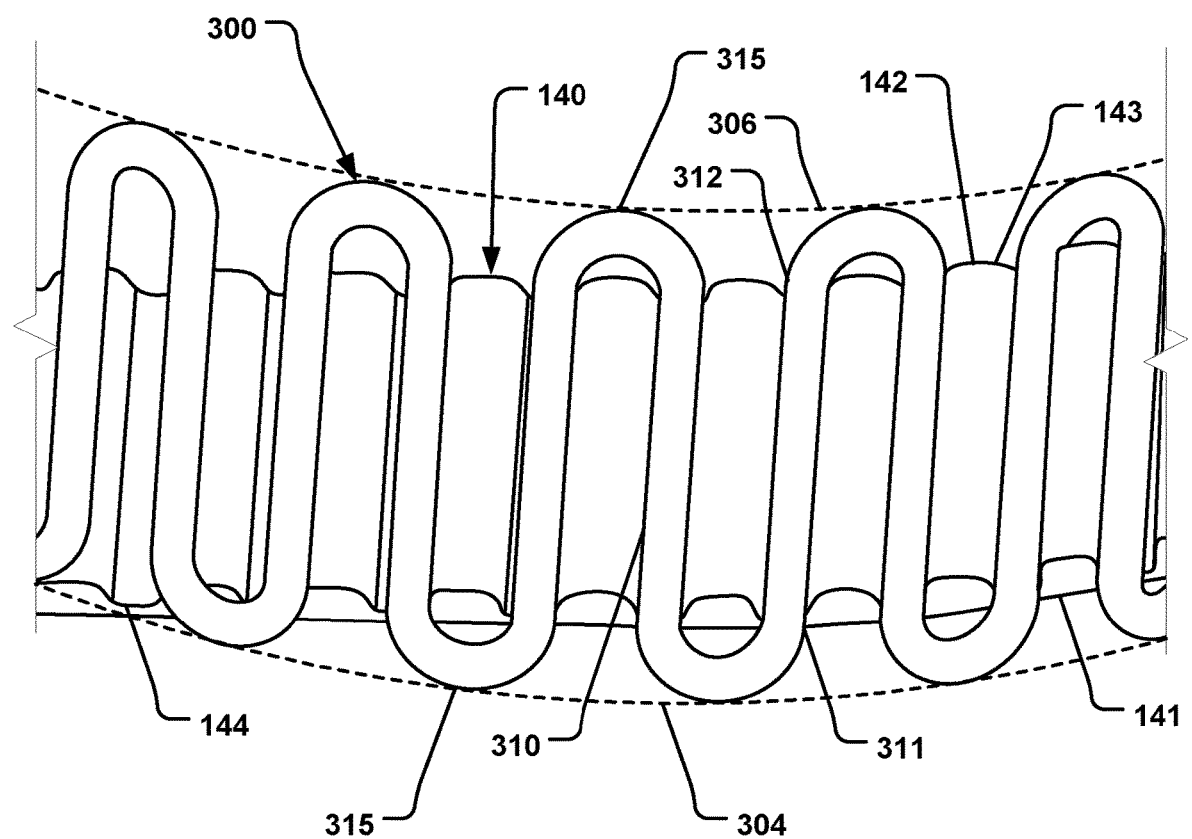
FIG. 10 is a top perspective view of either of the ring tensioners of FIG. 2 or of FIG. 9 engaged with a flexible belt.

FIG. 10 is an enlarged view of a ring tensioner 300, which could be, e.g., either the ring tensioner 100 of FIG. 2 or the ring tensioner 200 of FIG. 9 or another ring tensioner according to this disclosure, engaged with a flexible belt 140.

Similar to the ring tensioner 100 and the ring tensioner 200, the ring tensioner 300 has a first side 304 and a second side 306 defined by a plurality of parallel rungs 310, each rung 310 having a first end 311 and a second end 312. The first ends 311 of the rungs 310 are present at the first side 304 and the second ends 312 are present at the second side 306, with adjacent rungs 310 connected to each other by a curved or radiused portion 315, so that the radiused portions 315 alternate from the first side 304 to the second side 306. Because of this alternating placement of the radiused portions 315, neither side 304, 306 is continuous, but has gaps, voids, or spans between the radiused portions 315.

The ring tensioner 100 installed on a toothed belt 140 having individual transverse teeth 142 evenly spaced the length of the belt 140 with land regions 144 between adjacent teeth 142; the belt 140 has a first edge 141 and an opposite second edge 143.

The rungs 310 of the ring tensioner 300 surround the teeth 142 and seat within the land regions 144. The radiused portions 315 curl around the teeth 142 and overhang the side edges 141, 143; particularly, the first end 311 of the rung 310 overhangs the first side edge 141 and the second end 312 of the rung 310 overhangs the second side edge 143. Having the radiused portion 315 curl around a tooth 142 improves the retention of the ring tensioner 300 on the belt 140 during operation.

In this ring tensioner 300 with this belt 140, the rungs 310 are slightly longer than the belt is wide (between the first edge 141 and the second edge 143), which provides an increase the available tolerance for the ring tensioner 300 to engage with the belt 140.

Figure 11:
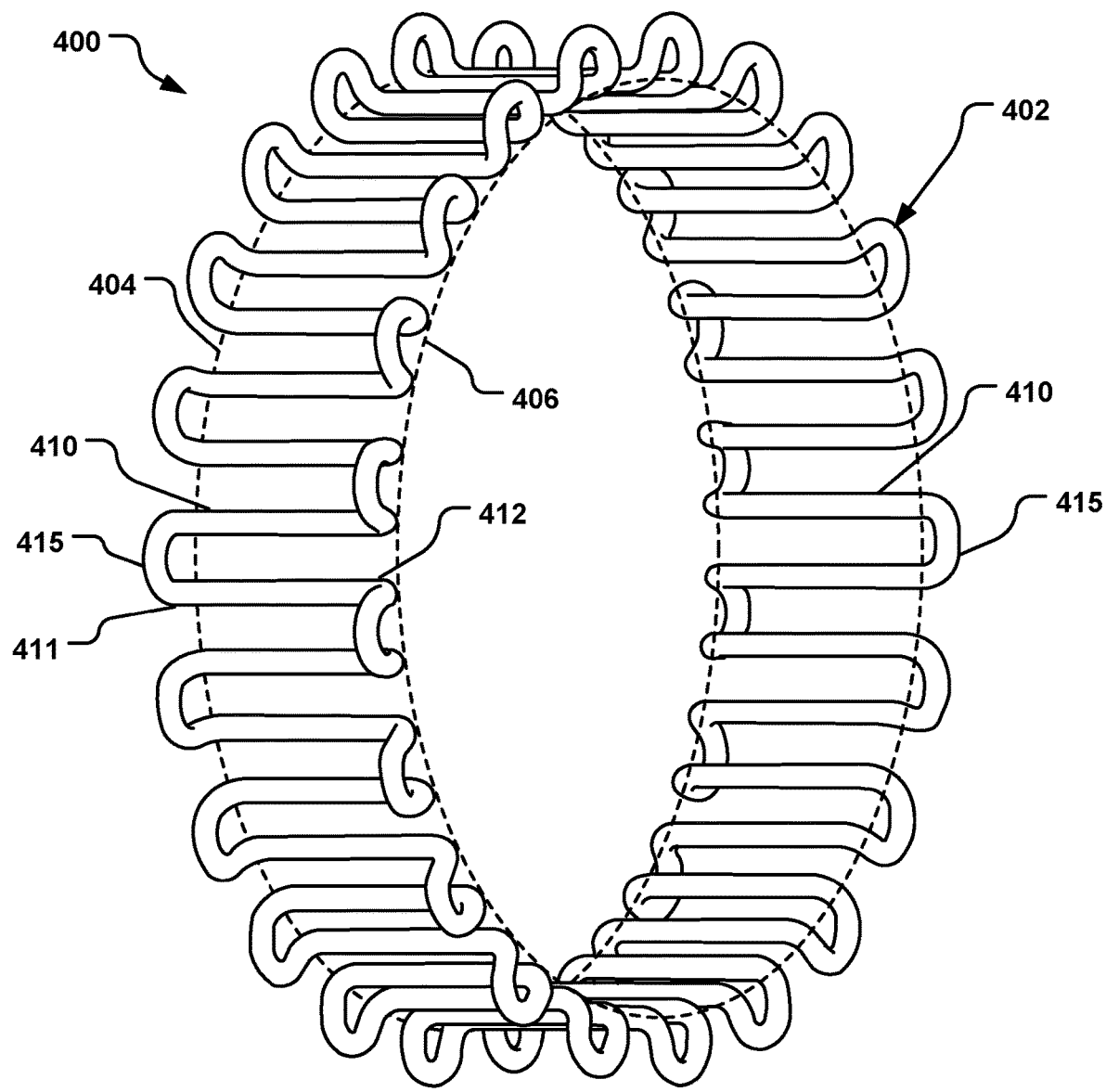
FIG. 11 is a perspective view of a third example of a ring tensioner.
Figure 12:
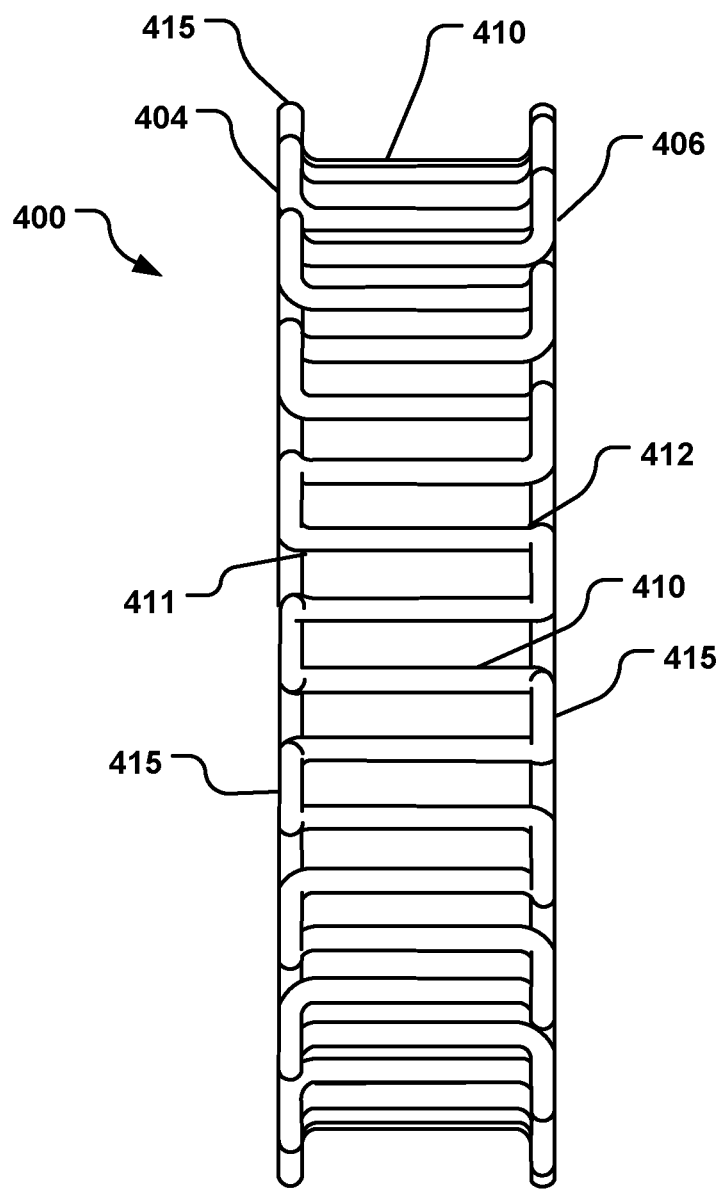
FIG. 12 is a top view of the ring tensioner of FIG. 11.
Figure 13:
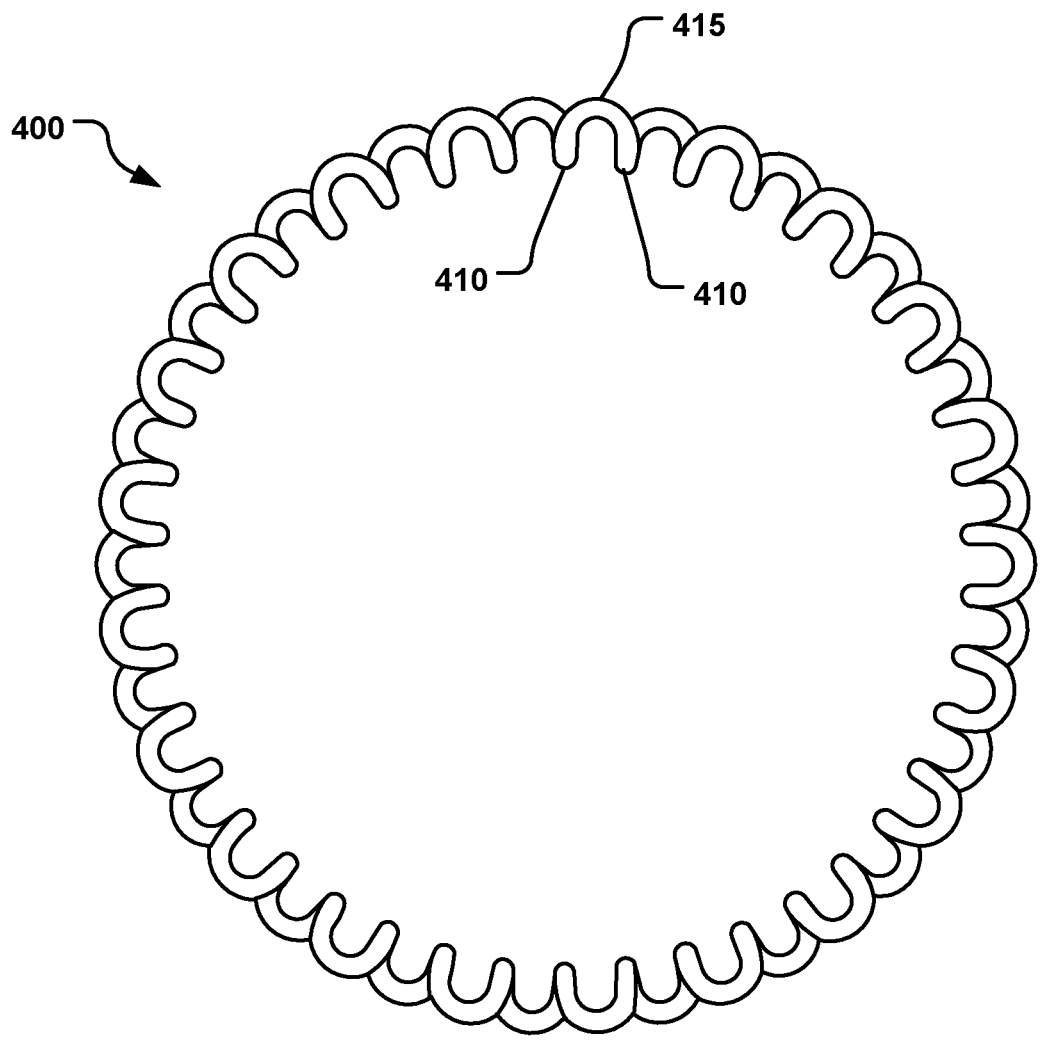
FIG. 13 is a side view of the ring tensioner of FIG. 11.

FIGS. 11 through 13 shows another ring tensioner 400. It is to be understood that various features and/or details from the tensioners 100, 200, 300 described above, may be applied to this ring tensioner 400 unless contrary to the construction.

Similar to the previous ring tensioners, the ring tensioner 400 has a ring body 402 having a first side 404 and a second side 406. The body 402 is formed by a plurality of parallel rungs 410, each rung 410 having a first end 411 and a second end 412. The first ends 411 of the rungs 410 are present at the first side 404 of the body 402 and the second ends 412 of the rungs 410 are present at the second side 406 of the body 402. Two adjacent rungs 410 are connected to each other by a curved or radiused portion 415, so that the radiused portions 415 alternate from the first side 404 to the second side 406. Because of this alternating placement of the radiused portions 415, neither side 404, 406 is continuous, but has gaps, voids, or spans between the radiused portions 415.

Unlike the ring tensioners 100, 200, 300 described above, the radiused portions 415 of the ring tensioner 400 are not planer with the rungs 410, but rather, the radiused portions 415 are approximately at a right angle to the rungs 410 (seen best in FIG. 12). This angle between the rungs 410 and the radiused portions 415 is no greater than 90 degrees, when measured from the planar orientation (as with the ring tensioners 100, 200, 300); this angle may be any between being planar with the rungs 410 (i.e., 0 degrees) (as in the ring tensioners 100, 200, 300) to 90 degrees. With such angles, the radiused portions 415 on the sides 404, 406 do not point towards each other, as they would if the angle was greater than 90 degrees.

These radiused portions 415, by being bent out-of-plane from the rungs 410, in a radial direction, provide a flange at the sides 404, 406 of the ring tensioner 400, which may facilitate tracking of the ring tensioner 400 on a belt and improve engagement of the ring tensioner 400 with the belt, when in operation. The radiused portions 415 may abut the side edges of the belt, depending on the width of the tensioner 400 from side 404 to side 406 and the width of the belt.

Thus, described herein are several specific examples of ring tensioners having a plurality of rungs and non-continuous side edges, formed by radiused portions connected alternating rungs.

The ring tensioners described herein and variations thereof may be incorporated into a broad range of belt drive systems. The ring tensioners can be used in numerous other systems including ABDS (accessory belt drive systems), SBDS (synchronous belt drive system), BSG (belt starter generator, e.g., for hybrid vehicles), water pumps, timing, etc. In general, the ring tensioners can be used with synchronous belts regardless of the application.

The above specification and examples provide a complete description of the structure and use of exemplary implementations of the invention. The above detailed description, therefore, is not to be taken in a limiting sense. It is to be understood that other implementations are contemplated and may be made without departing from the scope or spirit of the present disclosure. Elements or features of one example, embodiment or implementation may be applied to any other example, embodiment or implementation described herein to the extent such contents do not conflict. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A ring tensioner comprising:
a plurality of equally spaced parallel rungs, each rung having a first end and a second end, the first ends of the rungs at a first side of the ring tensioner and the second ends of the rungs at a second side of the ring tensioner;
a first circumferential edge at the first side of the ring tensioner that is not continuous; and
a second circumferential edge at the second side of the ring tensioner that is not continuous.

2. The ring tensioner of claim 1, wherein:
the first circumferential edge comprises gaps alternating with radiused portions connecting the first ends of the rungs; and
the second circumferential edge comprises gaps alternating with radiused portions connecting the second ends of the rungs,
where the gaps in the first circumferential edge alternate with the gaps in the second circumferential edge.

3. The ring tensioner of claim 2, wherein the radiused portions are generally planar with the rungs being connected.

4. The ring tensioner of claim 2, wherein the radiused portions are at an angle of 0 to 90 degrees in relation to the rungs being connected.

5. The ring tensioner of claim 1, wherein the ring tensioner comprises metal.

6. The ring tensioner of claim 5, wherein the ring tensioner consists essentially of metal.

7. The ring tensioner of claim 5, wherein the ring tensioner comprises a single metal wire.

8. The ring tensioner of claim 7, wherein the metal wire has a first end joined to a second end.

9. The ring tensioner of claim 8, wherein the first end of the metal wire is welded, brazed, or soldered to the second end of the metal wire.

10. A ring tensioner comprising:
a plurality of parallel rungs and radiused portions, each radiused portion connecting two adjacent rungs;
a first circumferential edge of the ring tensioner that is not continuous;
a second circumferential edge of the ring tensioner that is not continuous, wherein the first circumferential edge comprises gaps alternating with the radiused portions; and
the second circumferential edge comprises gaps alternating with the radiused portions,
where the gaps in the first circumferential edge alternate with the gaps in the second circumferential edge.

11. The ring tensioner of claim 10, wherein the radiused portions are generally planar with the rungs being connected.

12. The ring tensioner of claim 10, wherein the radiused portions are at an angle of 0 to 90 degrees in relation to the rungs being connected.

13. The ring tensioner of claim 10, wherein the ring tensioner consists of a single metal wire.

14. A ring tensioner comprising:
a plurality of pairs of parallel rungs, where each pair of parallel rungs has a first rung and a second rung that are connected to each other at only one end of each of the first rung and the second rung by a radiused portion, where adjacent pairs of parallel rungs share one rung, wherein
a first circumferential edge of the ring tensioner comprises gaps alternating with the radiused portions; and
a second circumferential edge of the ring tensioner comprises gaps alternating with the radiused portions, where the gaps in the first circumferential edge alternate with the gaps in the second circumferential edge.

15. The ring tensioner of claim 14, wherein each radiused portion is generally planar with the first rung and the second rung being connected.

16. The ring tensioner of claim 14, wherein each radiused portion is at an angle of 0 to 90 degrees in relation to the first rung and the second rung being connected.

17. The ring tensioner of claim 14, wherein the ring tensioner consists of a single metal wire.

* * * * *